US012570149B2

(12) United States Patent     (10) Patent No.:   US 12,570,149 B2
Bove, Jr. et al.        (45) Date of Patent:     Mar. 10, 2026

(54) USER INTERFACE METHOD AND APPARATUS FOR VEHICLE DISPLAY

(71) Applicant: Adeia Guides Inc., San Jose, CA (US)

(72) Inventors: V. Michael Bove, Jr., Wrentham, MA (US); Serhad Doken, Bryn Mawr, PA (US); Jean-Yves Couleaud, Mission Viejo, CA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 228 days.

(21) Appl. No.: 18/196,938

(22) Filed: May 12, 2023

(65) Prior Publication Data

US 2024/0375511 A1     Nov. 14, 2024

(51) Int. Cl.

| | |
|---|---|
| *G06V 20/59* | (2022.01) |
| *B60K 35/00* | (2024.01) |
| *B60K 35/85* | (2024.01) |
| *G06V 40/10* | (2022.01) |
| *G06V 40/20* | (2022.01) |
| *B60K 35/10* | (2024.01) |
| *B60K 35/28* | (2024.01) |
| *B60K 35/80* | (2024.01) |

(52) U.S. Cl.
CPC ............ *B60K 35/85* (2024.01); *G06V 20/593* (2022.01); *G06V 40/10* (2022.01); *G06V 40/28* (2022.01); *B60K 35/10* (2024.01); *B60K 35/28* (2024.01); *B60K 35/80* (2024.01); *B60K 2360/1468* (2024.01); *B60K 2360/178* (2024.01); *B60K 2360/56* (2024.01); *B60K 2360/589* (2024.01)

(58) Field of Classification Search
CPC ........ B60K 35/00; B60K 35/10; B60K 35/28; B60K 35/80; B60K 35/85; B60K 2360/1468; B60K 2360/178; B60K 2360/56; B60K 2360/589; B60K 2360/21; G06V 20/593; G06V 40/10; G06V 40/28
See application file for complete search history.

(56) References Cited

U.S. PATENT DOCUMENTS

| | | | | |
|---|---|---|---|---|
| 8,638,989 | B2 | 1/2014 | Holz | |
| 2014/0309806 | A1* | 10/2014 | Ricci ....................... | G06F 21/31 |
| | | | | 701/1 |
| 2015/0360564 | A1* | 12/2015 | Kalbus ................... | B60K 35/60 |
| | | | | 701/36 |

(Continued)

FOREIGN PATENT DOCUMENTS

DE     102019128817 A1   *   4/2021

OTHER PUBLICATIONS

Machine Translation: DE-102019128817-A1 (Year: 2021).*

(Continued)

*Primary Examiner* — Anne Marie Antonucci
*Assistant Examiner* — Connor L Knight
(74) *Attorney, Agent, or Firm* — HG LAW LLP

(57) ABSTRACT

Systems and methods for enabling control of various functions of a vehicle based on which occupant made a control input are described. In an example, a method includes determining which occupant of the vehicle is interacting with the vehicle user interface (UI) based on image data or an RF signal coupled to the occupant making the control input, and then responsively executing an action corresponding to the control input only if the occupant making the control input is permitted to do so.

20 Claims, 6 Drawing Sheets

(56) References Cited

U.S. PATENT DOCUMENTS

| | | | | |
|---|---|---|---|---|
| 2016/0299617 A1* | 10/2016 | Hanson | B60K 35/22 | |
| 2018/0088661 A1* | 3/2018 | Betancourt | G06F 3/0227 | |
| 2018/0288232 A1* | 10/2018 | Macneille | H04W 4/026 | |
| 2022/0297704 A1* | 9/2022 | Popa | B60W 50/0098 | |
| 2023/0131471 A1* | 4/2023 | Sobecki | B60R 1/04 | |
| | | | | 348/148 |
| 2023/0145972 A1* | 5/2023 | Graessley | G01C 21/3602 | |
| | | | | 701/400 |
| 2024/0264717 A1* | 8/2024 | Raz | G06V 20/597 | |

OTHER PUBLICATIONS

Department of Transportation National Highway Traffic Safety Administration Docket No. NHTSA-2010-0053 "Visual-Manual NHTSA Driver Distraction Guidelines For In-Vehicle Electronic Devices" vol. 78, No. 81 (Apr. 26, 2013) (73 pages).
Kang et al., "Review of capacitive coupling human body communications based on digital transmission," ICT Express, 2(4):180-187 (2016).
Kooverjee, "New Tech Will Stop Drivers Seeing The Passenger Display," Mar. 12, 2022 (New Tech Will Stop Drivers Seeing The Passenger Display) (4 pages).
Tomlinson et al., "Comprehensive Survey of Galvanic Coupling and Alternative Intra-Body Communication Technologies," IEEE Communications Surveys & Tutorials, 21(2):1145-1164 (Secondquarter 2019).
Zimmerman, "Personal Area Networks: Near-field intrabody communication," IBM Systems Journal, 35(3.4):609-617 (1996).

* cited by examiner

USER INTERFACE METHOD AND APPARATUS FOR VEHICLE DISPLAY

BACKGROUND OF THE INVENTION

One or more embodiments of the present disclosure relate to enabling occupant-based control of various functions of a vehicle, by determining which occupant of the vehicle is interacting with the vehicle user interface (UI) and executing a corresponding action only if the requesting occupant is permitted to do so.

SUMMARY

Many vehicle functions are controlled by a UI. In this disclosure, reference may be made to a "vehicle UI" which may be used to control various functions of a vehicle. However, it should be appreciated that the same principles and functions may be applied to any suitable UI, including those UI that are configured to control functions of devices other than the vehicle. For example, in some embodiments the UI may be a part of a handheld device, and it should be appreciated that the features described herein may be used to control functions of the handheld device (e.g., music, navigation, etc.) to be different based on the vehicle seat in which the person interacting with the handheld device sits. Thus, while examples are disclosed with reference to a "vehicle UI," it should be appreciated that the more general term "UI" may be used instead.

In an embodiment, a vehicle UI is a user interface including output components for outputting information relating to one or more in-vehicle systems and input components for manipulating control of one or more in-vehicle systems. Example in-vehicle systems include media playback systems, navigation systems, driving control or assistance systems, in-cabin monitoring systems, climate control systems, and vehicle component control systems (e.g., relating to windows, doors, locks, wipers or lights). Some vehicles may include a touch screen display positioned in a central location on the dashboard, with which occupants can interact to control various functions of the vehicle such as entertainment, navigation, and climate control. The vehicle UI is often accessible by both the driver and the passenger, such that either occupant may interact with and control the various vehicle functions. The vehicle UI may enable control of some vehicle functions whenever the vehicle is on, such as changing the volume, changing the radio station, turning on heated seats, and more. The vehicle UI may prevent control of some other vehicle functions at certain times for safety reasons, in some cases based on National Highway Traffic Safety Administration (NHTSA) guidelines. For example, these guidelines may limit the display of (a) video not related to driving, (b) certain graphical or photographic images, (c) automatically scrolling text, (d) manual text entry for the purpose of text-based messaging, other communication, or internet browsing, and (e) text for reading from books, periodical publications, web page content, social media content, text-based advertising and marketing, or text-based messages. Additionally some vehicle manufacturers may deactivate various configuration screens, such as Bluetooth pairing, text entry for navigation, and other functions while the vehicle is not parked.

In many circumstances, safety concerns are alleviated if these functions are controlled by the passenger during movement of the vehicle rather than by the driver. However, the vehicle UI may be unable to determine whether a control input was made by the driver (and should therefore be ignored), or whether the control input was made by a passenger (and should therefore be acted on).

With these concerns in mind, embodiments of the present disclosure provide methods and systems for enabling a vehicle and/or vehicle UI to determine which occupant of the vehicle made a given control input. The vehicle UI may identify the vehicle seat position from which a control input was received, and thereby determine whether the driver or passenger made the control input. The vehicle UI can then selectively execute an action corresponding to the received control input, depending on whether the requesting occupant is permitted to make the control input at that time.

The vehicle UI may detect a control input based on an interaction with the vehicle UI, and based on that interaction, determine a vehicle seat position corresponding to the occupant who made the control input. The vehicle UI may then determine whether execution of an action corresponding to the received control input is permitted when selected by the occupant in the determined vehicle seat position. And if the action is permitted, the action may be carried out. Otherwise, the control input may be ignored, and/or an alert may be presented indicating that the control input was not permitted at that time.

In one example, the vehicle UI may display a navigation application including a text box for inputting an address. While the vehicle is in motion, the driver may not be permitted to input text to the text box, while the passenger may be permitted to input text. When the vehicle UI detects a control input (e.g., a finger touching the touchscreen) attempting to input text into the text box, whether that input text is received or acknowledged and acted on depends on whether the control input is made by the driver (i.e., not permitted) or the passenger (permitted). If the vehicle and/or vehicle UI determines that the received input was made by the driver, the input may be ignored, and/or an alert may be output indicating that the driver is not permitted to input text at this time. But if the vehicle and/or vehicle UI determines that the received input was made by the passenger, the input may be received and displayed in the text box.

In some examples, the vehicle and/or vehicle UI may determine which occupant provided the control input based on image data captured by a camera in the vehicle. The camera may be oriented to have a field of view covering an area proximate the vehicle UI (e.g., directed "into" or toward the cabin or cockpit), allowing the camera to track the hands, fingers, arms, or other parts of the occupants as they interact with the vehicle UI. The image data can then be analyzed to determine whether a hand of the driver, passenger, or some other occupant made the control input.

In other examples, a radio frequency (RF) signal may be coupled to one or more of the vehicle seats, steering wheel, seat belts, handheld devices corresponding to the driver or passenger, or another part of the vehicle. When an occupant interacts with the vehicle UI, the vehicle UI may detect the coupled RF signal and thereby identify which vehicle seat position corresponds to the received control input. Each vehicle seat position may have a different associated RF signal, such that the vehicle UI can differentiate between inputs made by an occupant in each different vehicle seat position.

In some examples, the vehicle UI may be a single screen that provides two separate displays for the driver and passenger. For example, the vehicle UI may include a stereoscopic display that allows the driver and passenger to view different displays based on their respective viewing angles. The vehicle UI may detect a control input to the vehicle UI, determine which occupant made the control input, and then determine which of the two displays corresponds to the received control input (e.g., based on the occupant making the control input). The vehicle UI can then determine the action corresponding to the received control input, which may be different for each of the first and second displays even if the point of contact with the vehicle UI is the same. That is, in some examples, the two displays provided by the single vehicle UI screen may overlap in whole or in part, and one or more icons or controls from each of the two displays may overlap on the shared screen. When a control input is detected at a given position on the screen of the vehicle UI (e.g., a finger touch on a portion of the screen), the corresponding control or action may differ based on whether the touch was made by an occupant viewing the first display or the second display. Thus, by determining which occupant made the control input, the vehicle UI can determine which of the first or second display the control input corresponds to, and thus which corresponding action should be executed. This setup enables the vehicle UI to display to the driver a first subset of all available actions, which may include only those actions that are permitted to be controlled by the driver, and without providing any actions that are not permitted to be controlled by the driver. Similarly, the vehicle UI can display to the passenger a second subset of actions, which may include only those actions that are permitted to be controlled by the passenger. The second set of actions corresponding to the passenger may be different from the first subset of actions corresponding to the driver. Thus, each occupant may only be able to view and control actions that are permitted for an occupant in their respective vehicle seat position, and may be unable to view actions that are not permitted for an occupant in their respective vehicle seat position.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which.

DETAILED DESCRIPTION

As noted above, many vehicle functions are controlled by vehicle user interfaces. In some circumstances, such as when the vehicle is moving, one or more occupants may be prevented from accessing certain functions for safety reasons. Some vehicle user interfaces may be configured to prevent all occupants from accessing the restricted functions during the restricted time. For example, the vehicle user interface may prevent all occupants, including the passenger(s), from entering navigation text, switching the vehicle from two wheel drive to four wheel drive, or connecting a new Bluetooth device while the vehicle is not parked.

There is a desire to have a vehicle UI that can differentiate between control inputs made by a driver and those made by a passenger. In some instances, it may be helpful to differentiate between passengers. For example, it may be desirable to provide a first set of authorized actions for a passenger in the front passenger seat and a second set of authorized actions for one or more passengers in a back seat. In any event, differentiating between the occupants of the vehicle may enable the passengers to operate the user interface differently from the driver, thereby enabling additional vehicle functions to be used even when the vehicle is not parked. Rather than preventing some functions when the vehicle is not parked, the vehicle user interface may enable those functions if controlled by the passenger, while continuing to prevent those functions if controlled by the driver.

Some embodiments of this disclosure may include an interface application running on a computing device of the vehicle (e.g., an integrated in-vehicle computer, controller, or "carputer"). One or more functions described herein may be performed by the interface application, the vehicle user interface, another system of the vehicle, and/or a combination thereof.

Figure 1:
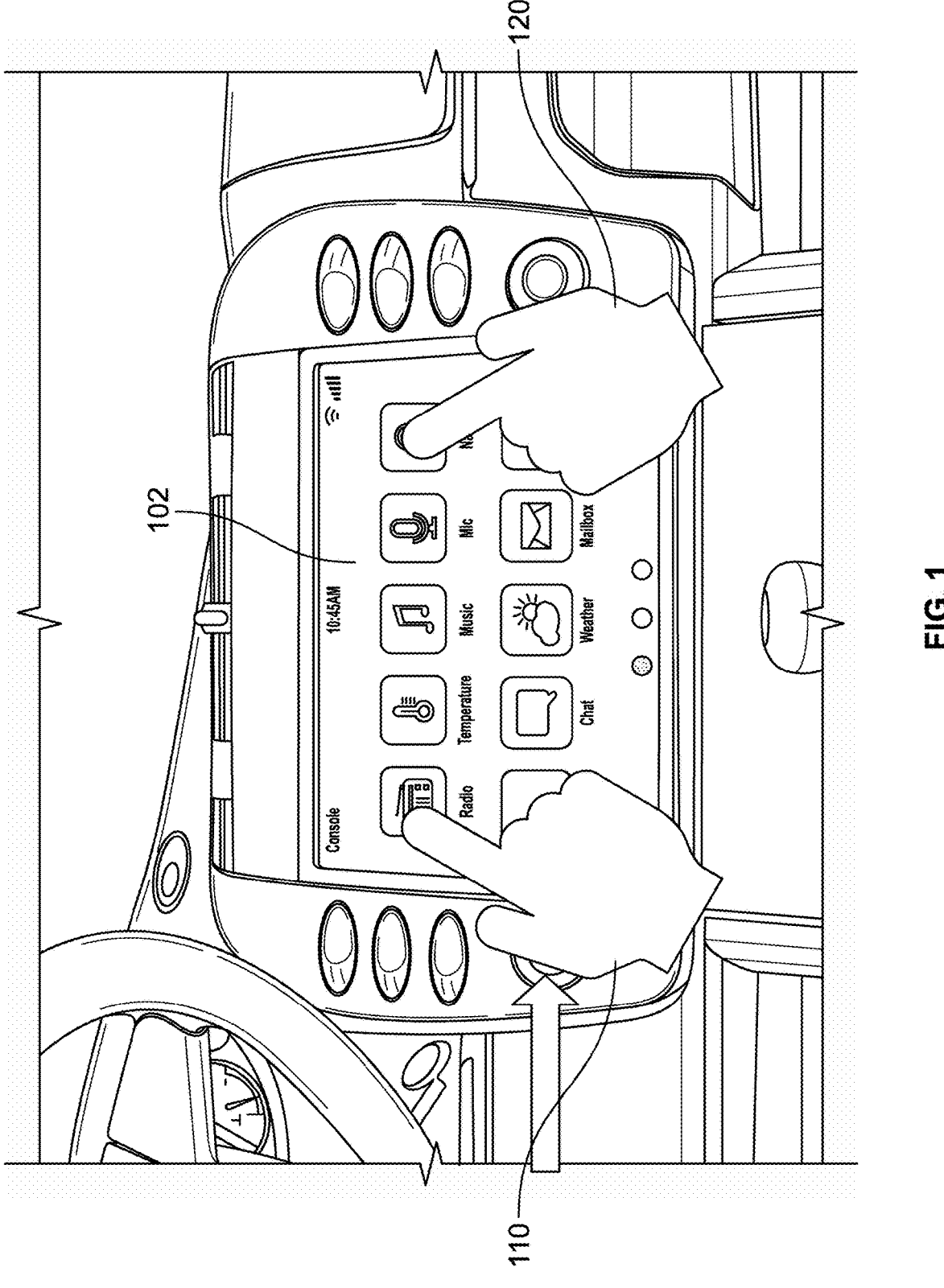
FIG. 1 illustrates an example scenario for determining which occupant of a vehicle has made a control input to a vehicle user interface, according to aspects of the present disclosure.

FIG. 1 illustrates an example scenario in which a vehicle user interface 102 is interacted with by a first occupant 110 (i.e., the driver), and a second occupant 120 (i.e., the passenger).

The vehicle UI 102 may include a capacitive or resistive touch screen, capacitive or resistive buttons, physical buttons, dials, levers, a joystick, a rotary controller, a heads up display or projected display (such as on the windshield), one or more microphones and/or speakers, one or more cameras, one or more antennas or other wireless components, and/or Bluetooth or other communication equipment. While this disclosure includes examples that are illustrated with respect to a touch screen, it should be appreciated that the same features and functionality may also be used with physical buttons, dials, levers, switches, and/or any other suitable user interface elements. Additionally, in some examples the UI may include an Augmented Reality (AR) component or may be fully AR. In these cases, some or all of the information presented by the UI may be presented via a connected AR device, and/or user input via the connected AR device may operate in the same or similar manner to the various user inputs described elsewhere in this disclosure.

In some examples, the vehicle UI may be static, while in other examples the vehicle UI may be configured to move around from one position to another. In certain examples, the vehicle UI may include a handheld device such as a smartphone, which may be communicatively coupled to the vehicle. In these cases, the handheld device may control one or more functions of the vehicle remotely, such as entertainment or navigation.

In the illustrated example, the vehicle UI 102 is positioned centrally within vehicle on the dashboard. In other examples, the vehicle UI may be positioned in front of the driver or passenger, between the driver and passenger on a center console, or in some other part of the vehicle. In some instances, the UI 102 may be distributed across multiple output interfaces or displays (e.g., including heads-up displays, headrest displays, or speaker systems) and input interfaces (e.g., including one or more touch screens, physical buttons, knobs, actuators, image sensors, biometric sensors, or microphones). In some embodiments, the vehicle UI may include facial recognition or other biometric recognition equipment (e.g., fingerprint sensor, iris scan, etc.), which may enable the vehicle UI to determine whether the driver, passenger, or other occupant is interacting with the vehicle UI.

In the illustrated example, the vehicle UI 102 is configured to display a plurality of selectable icons, each having an associated action. For example, the vehicle UI 102 includes icons relating to radio controls, temperature controls, music controls, microphone controls, and more. When the vehicle UI 102 detects a selection of a displayed icon, the vehicle UI may change the display to show options related to the selected icon.

FIG. 1 also illustrates a hand of a first occupant 110 seated in the driver seat, and a hand of a second occupant 120 seated in the passenger seat.

In some examples, an interface application operating in connection with the vehicle UI 102 is configured to detect, based on an interaction with the vehicle UI 102, a control input. The interaction and the control input may be from a first occupant or a second occupant, or from some other occupant of the vehicle. In some cases, the interaction may even be from non-occupant reaching into vehicle, or interacting with a remote device vehicle UI (such as a handheld device communicatively coupled to the vehicle UI 102).

The interaction with the vehicle UI 102 may include a tap, touch, swipe, drag, or any other movement with respect to the vehicle UI 102. In some examples, the interaction includes an audio input (e.g., speech or some other sound), which may be detected by a microphone coupled to the vehicle UI. In some examples, the interaction may include a gesture made by an occupant of the vehicle, which may be detected by a camera coupled to the vehicle UI. The gesture may include detecting movement of an occupant's head, eyes, hand, fingers, arm, another body part, and/or an object held by or controlled by the occupant (e.g., a stylus).

The interaction with the vehicle UI may include movement of the occupant with respect to the vehicle UI, contact of the occupant with the vehicle UI, and/or any subsequent movement of the occupant after contact with the vehicle UI. For example, the driver may move her hand from the steering wheel to the center touch screen display. The interaction with the vehicle UI in this case may include (1) the movement path taken by the driver's hand from the steering wheel to the touch screen, (2) the contact between the driver's hand and the touch screen itself, (3) any subsequent movement of the driver's hand on the touch screen (e.g., swipe), and/or (4) movement of the driver's hand after releasing contact with the touch screen (e.g., the path taken by the driver's hand from the touch screen back to the steering wheel). In some examples, the interaction with the vehicle UI may also include a detection of where on the vehicle UI contact was made (i.e., the position of the contact with the touch screen).

In some examples, the control input may be an input to one or more systems of the vehicle. such as the audio system, the navigation system, the climate control system, the entertainment system, the window control system, and more.

After detecting the control input based on the interaction with the vehicle UI, the interface application may be configured to determine a vehicle seat position corresponding to the interaction with the vehicle UI. This may include the interface application identifying which occupant made the control input. Various embodiments of the present disclosure may include one or more of the techniques described herein for determining which occupant made the control input to the vehicle UI.

Figure 2:
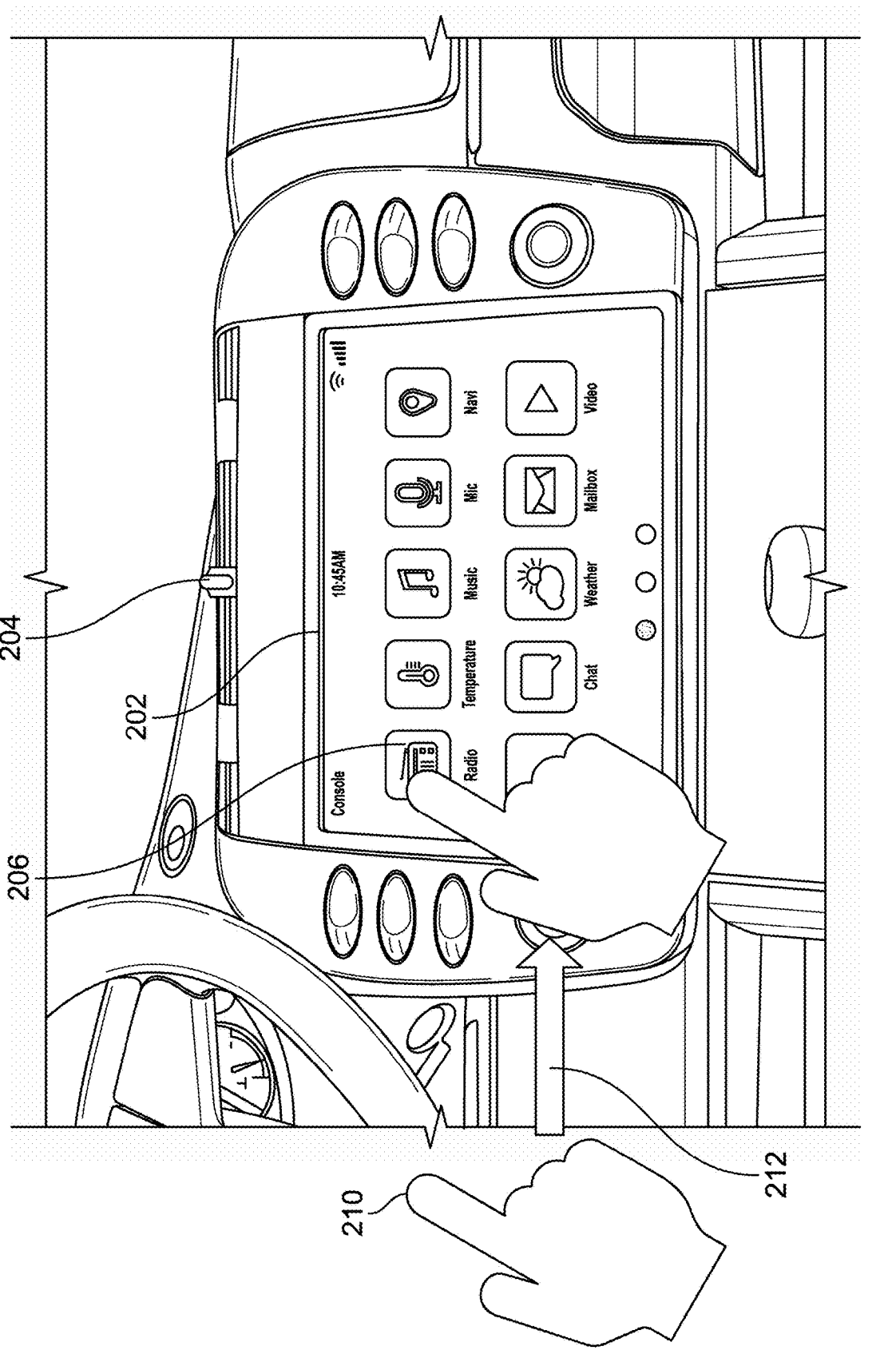
FIG. 2 illustrates another example scenario for determining which occupant of a vehicle has made a control input to a vehicle user interface, using image data from a camera, according to aspects of the present disclosure.

A first technique includes the interface application determining which occupant made the control input using visual detection, described primarily with respect to FIG. 2. FIG. 2 illustrates movement of an occupant's hand 210 with respect to the vehicle UI 202. A camera 204 captures image data of an area proximate the vehicle UI 202 during the interaction of the occupant 210 with the vehicle UI 202. In the illustrated embodiment, the interaction includes movement of the occupant's hand toward the vehicle UI 202, and contact with the touch screen of the vehicle UI 202 at icon 206. The occupant 210's hand travels along path 212 from left to right toward the vehicle UI 202, ending in contact with the touch screen.

The interface application may then determine, based on the image data captured by the camera 204, that the interaction with the vehicle UI 202 was made by the occupant 210 positioned to the left of the vehicle UI 202, and that the occupant 210 is seated in the left front seat of the vehicle (i.e., the driver's seat in jurisdictions with left-hand drive vehicles). The interface application may determine the seat position corresponding to the control input based on the interaction with the vehicle UI by analyzing the collected image data. For example, the interface application may analyze the image data to determine a path of a hand taken toward vehicle UI 202 during a time period prior to or during the interaction with vehicle UI 202. If the hand moved from driver side toward the vehicle UI 202 positioned in a middle of the vehicle, the interface application may determine that this movement correlates to a driver interaction. Similarly, if the hand moved from the passenger side toward the vehicle UI positioned in the middle of the vehicle, the interface application may determine that this movement correlates to a passenger interaction.

In some examples, the interface application may analyze the image data to determine a shape, orientation, pose, and/or configuration of a hand that interacts with the vehicle UI before, during, or after the interaction with the vehicle UI 202. For example, the interface application may identify a right hand interacting with the vehicle UI 202 based on the positioning of the thumb and other fingers, and responsively determine that the control input was made by the driver's side occupant (since the driver is most likely to interact with the center positioned vehicle UI with her closest hand, which is the right hand for vehicles in jurisdictions with left-hand drive vehicles). Similarly, the interface application may identify a left hand interacting with the vehicle UI 202 based on the positioning of the thumb and other fingers, and responsively determine that the control input was made by the passenger's side occupant (since the passenger is most likely to interact with the center positioned vehicle UI with her closest hand, which is the left hand for vehicles in jurisdictions with left-hand drive vehicles). It should be appreciated that these examples are illustrated for vehicles having the steering wheel on the left side of the vehicle, and that the same principles, functions, and operations described herein also apply in a mirrored manner to vehicles in right-hand drive jurisdictions where the steering wheel is positioned on the right side of the vehicle.

In some examples, an occupant may make a control input via an audio system of the vehicle, such as by speaking a command aloud. In this case, the interface application may identify the speaker of the command by comparing the received audio with one or more user profiles and/or using voice recognition. In addition or instead of a comparison between the received audio and a stored profile or using voice recognition, the interface application may detect a position in the vehicle corresponding to the received audio. For example, the vehicle may include one or more microphones or microphone arrays that enable localization of received audio, and therefore identification of the vehicle seat position corresponding to the received audio. Further, in some examples a camera system or image sensor may be configured to read the lips of an occupant, and determine the vehicle seat position based on the reading of the occupant's lips.

In some examples, the camera 204 may comprise a motion capture system having one or more sensors mounted adjacent to the vehicle UI 202. For instance, the sensors may be positioned along the top or bottom edges of the vehicle UI 202. The motion capture system may track the trajectory of a hand, such as hand 210, moving with respect to the screen prior to a touch event (e.g., path 212), and determine using one or more image analysis methods whether the hand 210 is approaching from the left or right side of the vehicle UI 202.

In some embodiments, the interface application can perform additional motion analysis to detect if the driver is moving a hand in a broad loop in order to attempt to fool the system into detecting that the hand is approaching from the opposite side. The interface application can detect this attempt to circumvent, and prevent control of certain functions if not permitted to be controlled by the driver.

In some examples, the camera 204 may be a single camera, while in other examples there may be multiple cameras. The cameras may capture an area immediately in front of the vehicle UI 202, and/or may capture a larger area to detect hands, arms, and other body parts of the occupants as well as the movement paths that they take when interacting with the vehicle UI. In one example, the camera 204 may be a driver monitoring camera, which may have a field of view that includes an area in front of the vehicle UI 202.

In some examples, an occupant may have an associated profile, detailing the occupant demographics and permissions. The profile may be shared across multiple vehicles (e.g., where a family has multiple vehicles with the same set of permission profiles active for each vehicle). In some examples, the vehicle UI may consider which functions are permitted or not for a given occupant based on multiple factors including, for example, (a) the vehicle seat position (driver or passenger), (b) a profile associated with the occupant (e.g., Alice may have certain permitted functions that are different than Bob, even when in the same seat position), (c) a category or demographic associated with the occupant (e.g., a kid may have different permissions than an adult), (d) a time of day (e.g., permissions for an occupant may change based on the time of day or day of the week), (e) a locations (e.g., permissions for a child, such as controlling audio, may change based on whether the vehicle is on a long road trip or is in a downtown environment), and (f) whether the vehicle is a rideshare vehicle (e.g., certain VIP rideshare passengers may have different permissions than regular passengers, such as controlling A/C).

Figure 3:
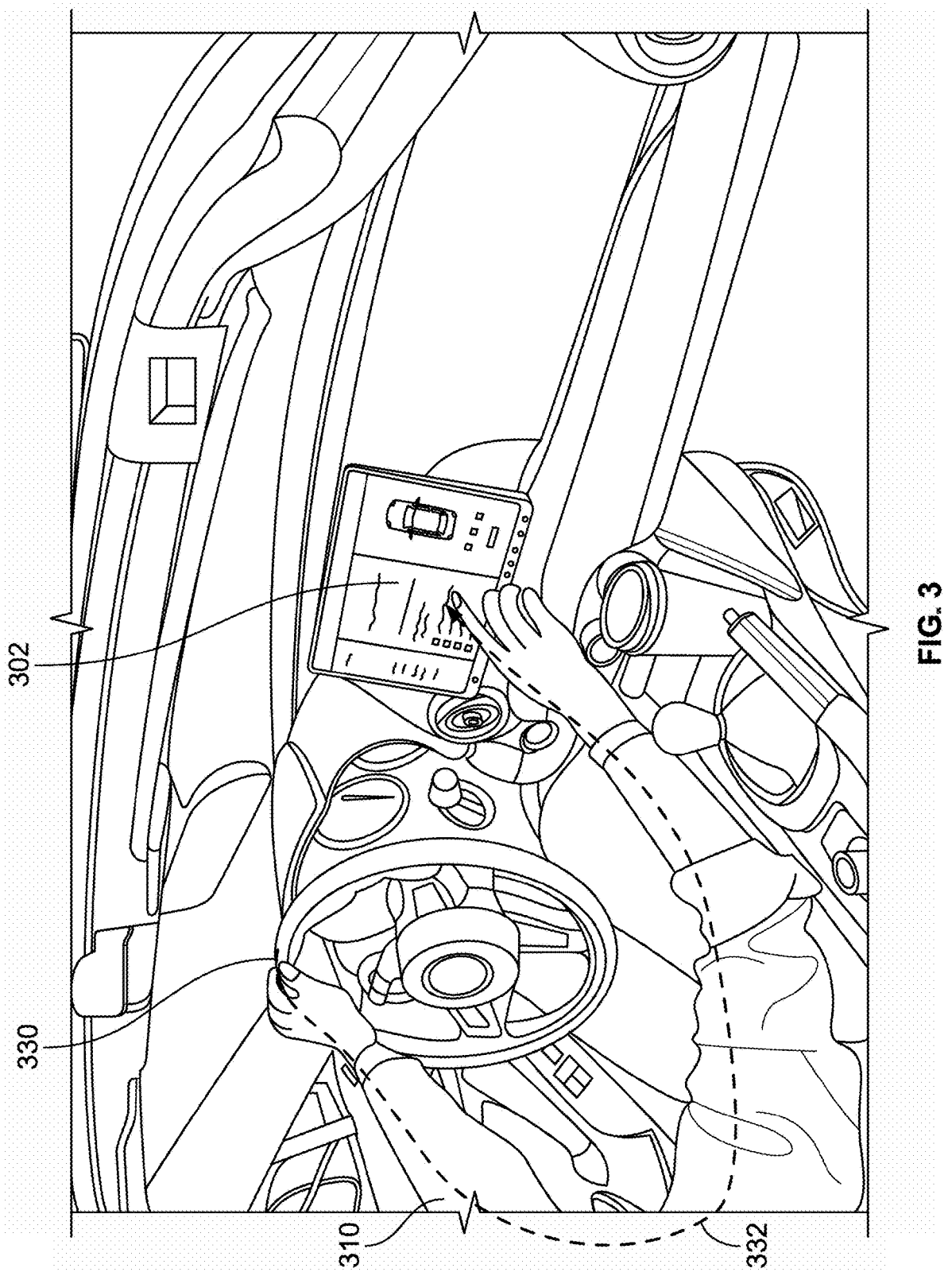
FIG. 3 illustrates another example scenario for determining which occupant of a vehicle has made a control input to a vehicle user interface, by detecting an RF signal, according to aspects of the present disclosure.

A second technique for determining the vehicle seat position corresponding to the interaction with the vehicle UI includes coupling an RF signal to one or more occupants of the vehicle, and then detecting the RF signal during the interaction of the occupant with the vehicle UI. This is discussed primarily with respect to FIG. 3.

In one example, a first RF signal is coupled to the steering wheel 330. When the driver 310 interacts with the vehicle UI 302, the first RF signal passes from the steering wheel 330 along path 332 and onto the vehicle UI 302, such that the first RF signal is detected by the vehicle UI 302 at the point of contact between the driver 310 and the vehicle UI 302. Each of the driver and the passenger may have a detectably different RF signal coupled thereto, such that the interface application may identify which RF signal is present at the point of contact with the vehicle UI 302, and thereby determine from which occupant the control input was made.

The RF signals coupled to the driver and passenger may be low power or very low power, and may have a frequency under 150 MHz. The use of low or very low power signals may prevent re-radiation from the body. That is, the RF signal may be of sufficiently low power that the body of the driver and/or passenger does not radiate the RF signal, and the RF signal is only detectable when contact is made between a finger, hand, or body part of the driver 310 (or passenger) and the vehicle UI 302. The RF signal power may also be sufficiently high that it is detectable by the vehicle UI 302 through gloves intended for use with touch screens.

In some examples, RF signals may be capacitively coupled into the driver and passenger, such as via the steering wheel, seat belts, seats, armrests, gear shift, and/or some other part of the vehicle interior that is in contact with the driver or passenger's bodies. Each of the driver and passenger may have a detectably different RF signal. For example, the RF signals may have different frequencies. Or alternatively, the RF signals may have the same carrier frequency but with different data sequences encoded thereon.

In one example, a first RF signal is coupled to a first seat of the vehicle, and a second RF signal coupled to a second seat of the vehicle. The interface application can identify the seat from which a control input is made by detecting which of the first or second RF signal is present at the point of contact with the vehicle UI when the control input is made. In some examples, the vehicle UI 302 may have an RF filter coupled to one or more layers of a touch screen, which enables the interface application to determine which RF signal is present at the point of contact (and thus whether the contact was made by the driver or passenger).

In some examples, particular types of vehicle interfaces may include specific functionality. For example, where the vehicle UI 302 includes a capacitive touch screen, it may be particularly sensitive to RF noise. To account for this sensitivity, the capacitive touch screen may be equipped with a notch filter to prevent interference with the normal operation of the touch screen. A notch filter may be effective in allowing the vehicle UI 302 to detect an RF signal, because the RF signal coupled to the driver or passenger that passes through the occupant's finger into the touch screen is narrowband and at a known center frequency.

In some examples, the RF signal for the driver and/or the passenger may change over time in order to prevent manipulation of the RF signal. This can include either or both of (a) changing the RF signal frequency (e.g., frequency hopping), and (b) changing a code used with the RF signal.

In some examples, the vehicle head unit may generate the RF signals. The vehicle UI 302 may be synced with the head unit such that the interface application can determine the timing of the RF signal sent out by the head unit and coupled to the occupant, and an expected time delay (e.g., several nanoseconds for the signal to pass through the occupant, plus an additional amount of time on the order of several milliseconds for receiving the signal and determining the signal frequency, and/or detecting a codeword in the signal if applicable), and ultimately a time at which the RF signal is detected at the vehicle UI 302. This setup may prevent manipulation of the system by an occupant attempting to generate his own RF signal to pretend to be from a particular vehicle seat position. That is, if it is known that the driver RF signal is frequency A and the passenger RF signal is frequency B, a nefarious driver may attempt to generate frequency B on his own, in order to pretend as though he is in the passenger seat and override the prohibition on control by the driver. Additionally, in some examples, the vehicle UI may provide haptic feedback when access to a non-permitted function is attempted. For instance, if the driver touches the capacitive screen and he or she is trying to perform an operation that he or she is not permitted to do, such as adding a search string query on the navigation bar when the vehicle is in motion, the vehicle UI may provide a haptic feedback using the capacitive screen indicating that this is not a permitted operation.

In addition to determining the vehicle seat position from which the control input was made, the interface application may also be configured to determine whether execution of an action corresponding to the received control input is permitted. That is, a first subset of vehicle actions may be permitted when selected by the driver, while a second subset of vehicle actions are not permitted when selected by the driver. The interface application may be configured to differentiate between permitted and not permitted actions based on the vehicle seat position from which a given control input was made.

If the interface application determines that a control input was made by a first occupant (e.g., the driver), and that the action corresponding to the control input is permitted when made by the first occupant, then the interface application may carry out or execute the action corresponding to the control input. However, if the interface application determines that the control input was made by the first occupant (e.g., the driver), and that the action corresponding to the control input is not permitted when made by the first occupant, then the interface application may ignore the control input and not carry out the corresponding action. Alternatively or in addition, the interface application may present an alert or notification (e.g., a visual or audio alert or notification) that the action corresponding to the control input is not allowed at this time, or is not allowed when requested by the first occupant (e.g., "the driver is not permitted to input navigation text at this time").

Figure 4:
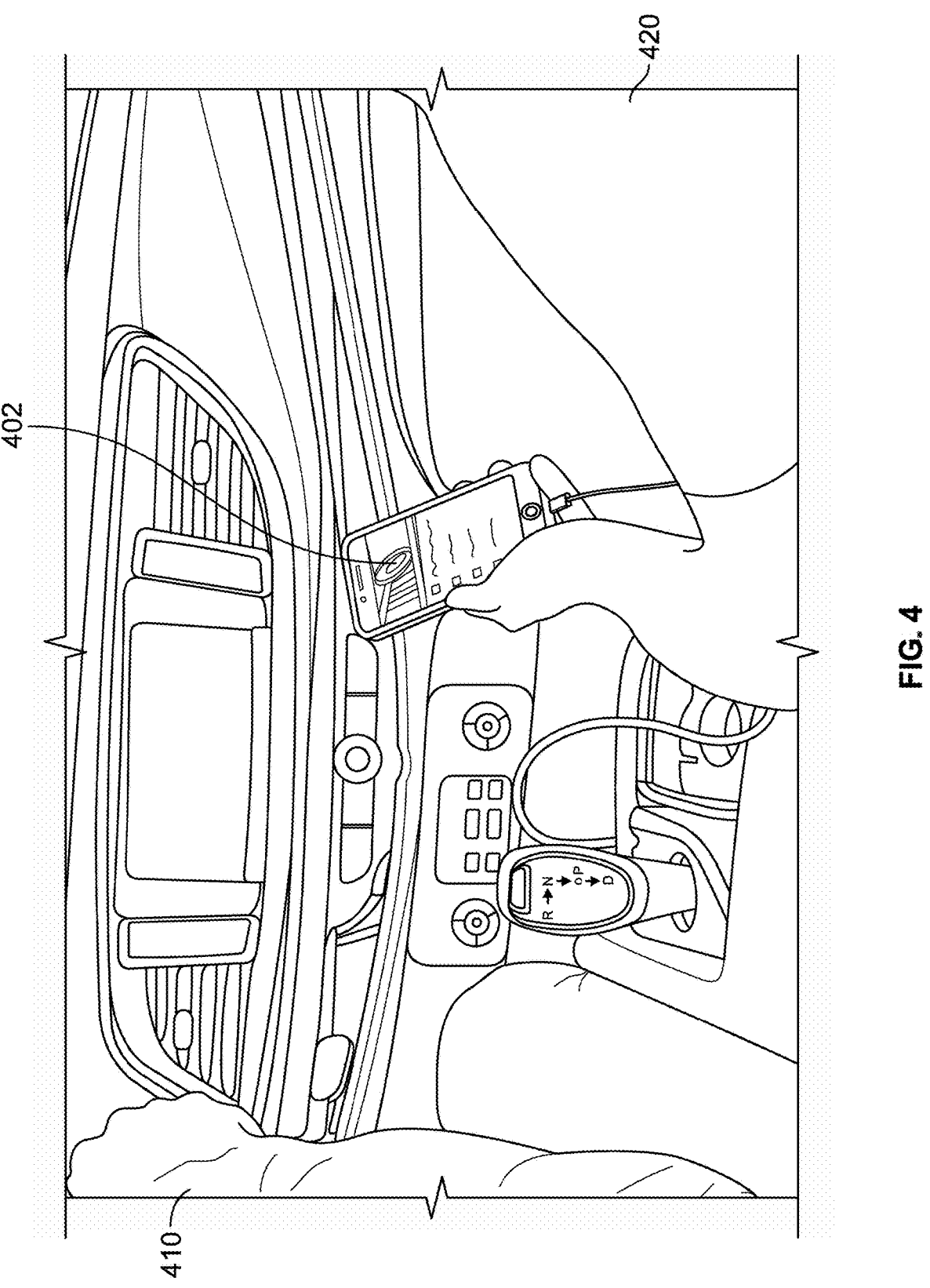
FIG. 4 illustrates another example scenario for determining which occupant of a vehicle has made a control input to a vehicle user interface, wherein the vehicle user interface is a handheld device, according to aspects of the present disclosure.

FIG. 4 illustrates an embodiment wherein the vehicle UI 402 comprises a handheld device. In some circumstances, various applications such as Waze, Apple CarPlay, and Android Auto have different behaviors when the vehicle is in motion, in order to attempt to prevent a driver from becoming distracted. For example, some applications require confirmation from the user that they are not driving in order to enable some functions such as text input.

In the embodiment illustrated in FIG. 4, the vehicle may generate and couple a different RF for each seat position, as noted above. When an occupant of the vehicle interacts with the handheld device vehicle UI 402, the handheld device vehicle UI 402 may detect the RF signal passing from the vehicle through the occupant and into the vehicle UI 402. Then depending on which RF signal is detected at the handheld device, the vehicle UI 402 can determine which occupant made the control input. In this embodiment, even if the driver 410 and the passenger 420 share the handheld device vehicle UI 402 over time (e.g., handing the device back and forth), the vehicle UI 402 can detect whether the driver 410 or passenger 420 is making a control input, and can react accordingly by permitting the corresponding action or not. Additionally, the screen displayed on the handheld device vehicle UI 402 can dynamically change based on who is holding it. For example, there may be a "driver mode" interface and a "passenger mode" interface which can be switched based on who is holding the device 402. Although the embodiments herein are described with reference to the handheld device vehicle UI 402, it should be appreciated that the functionality described herein may not be limited to a vehicle UI. That is, any application running on a handheld device may operate such that there is different functionality depending on which vehicle occupant is operating the device, and may provide different permitted functions based on the position of the occupant within the vehicle.

In some examples, a control input may have a different corresponding action depending on whether the control input is made by the driver or the passenger. For example, a single button on the vehicle UI may have a first corresponding action when selected by the driver, and a second corresponding action when selected by the passenger. The interface application may be configured to determine whether the first occupant or the second occupant selected the control input, and then selectively execute either the first action or the second action based on whether the first occupant or the second occupant selected the control input. For example, there may be a single button that controls the heaters for both the driver and passenger heated seat functionality. When a control input is detected for the heated seats, determining whether the heated seat control was selected by the driver or the passenger enables a single button to control both the driver and passenger heated seats, while allowing each of the driver and the passenger to retain control of their own seat.

In some examples, the vehicle UI may comprise multiple distinct user interfaces, each visible to only one of the driver or passenger. For instance, the vehicle UI may include a stereoscopic display (e.g., using parallax barriers, a lenticular array, directional backlights, etc.) that allow for two angularly separated viewers such as the driver and passenger to view different 2D images on a single display. The vehicle UI can also include a single touch screen interface having two different layouts, depending on the angle at which the occupant views the display. Some control inputs may overlap, while other may be different. As such, a single tap on the touch screen of the vehicle UI may correspond to two different control inputs depending on which of the two user interfaces corresponds to the tap.

Enabling a vehicle UI to have separate displays for the driver and passenger can reduce driver distractions. For instance, when a passenger interacts with the UI, and screen changes or movement on the screen may not be viewable to driver. Additionally, if touch controls (e.g., icons or buttons) occur in non-overlapping areas of the driver's and passenger's respective user interfaces, an additional confirmation is available that a touch is coming from the passenger and not the driver. For example, if the touch is in a region of the screen that contains an actuatable element only visible to the passenger, this provides further evidence that the passenger is the person interacting. Similarly, if a touch is in a region of the screen that contains an actuatable element only visible to the driver, that provides further evidence that the driver is the person interacting.

In some examples including a single display that has a first user interface for the driver and a second user interface for the passenger, when a control input is detected, the interface application may determine from which vehicle seat the control input was made. The interface application can then determine which of the two user interfaces (both presented on the same display) is an active user interface. Then, if the received control input corresponds to a permitted action on the active user interface, the interface application may execute the permitted action. In one example, a first user interface of the single vehicle UI directed at the driver may include controls that are permitted to be accessed by the driver, and the second user interface directed at the passenger includes controls that are permitted to be accessed by the passenger. When a control input is detected, the vehicle seat position from which the input was made is determined, and the corresponding user interface (i.e., the first or second) is determined. The point of contact with the vehicle user interface may correspond to a first control input on the first user interface, and a second control input on the second user interface. Thus, by determining which user interface is the active user interface, the interface application can determine which control input has been selected, and can execute the corresponding action.

Figure 5:
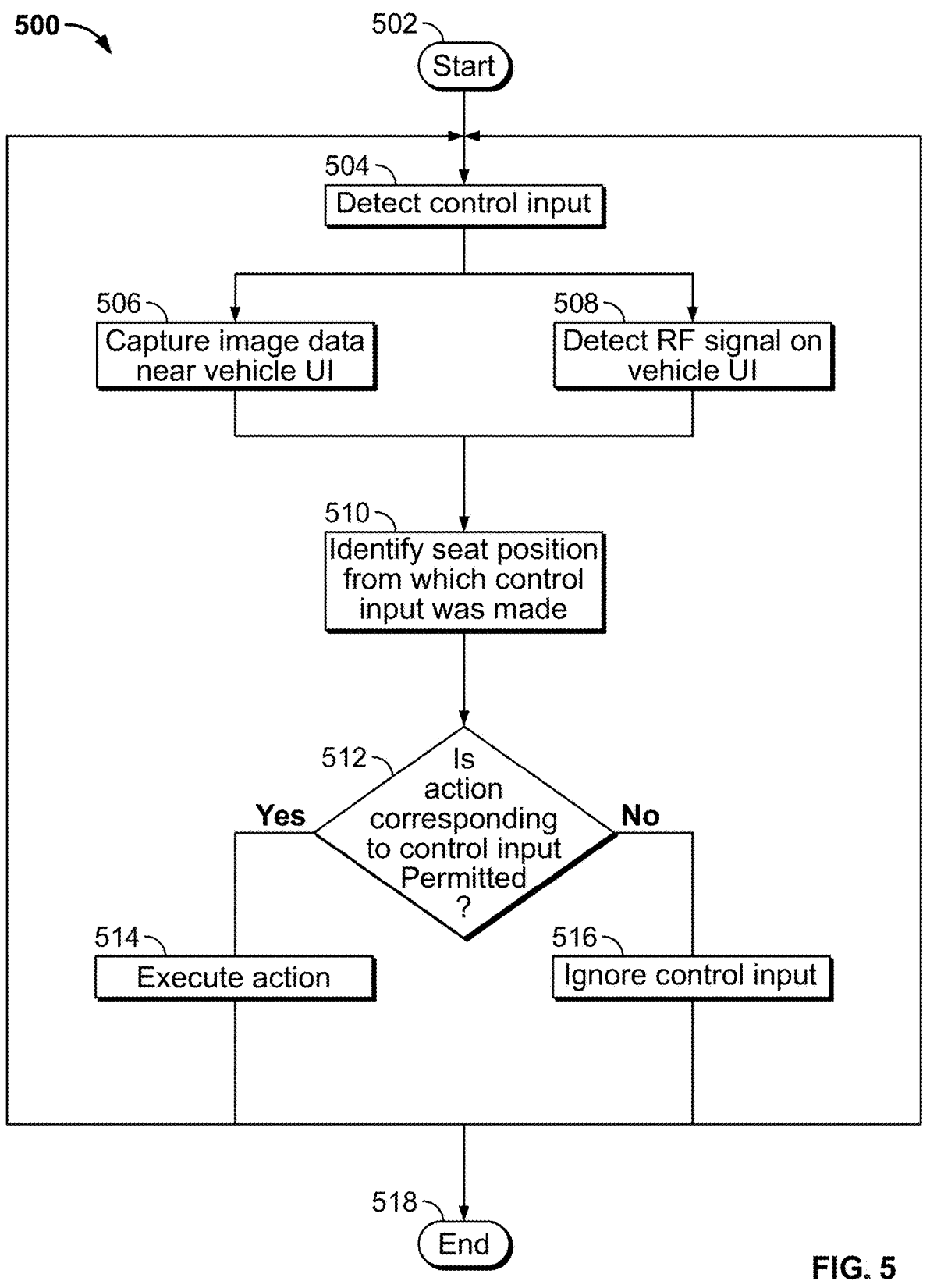
FIG. 5 illustrates an example method for determining which occupant of a vehicle has made a control input to a vehicle user interface, according to aspects of the present disclosure.
Figures 6, 7:
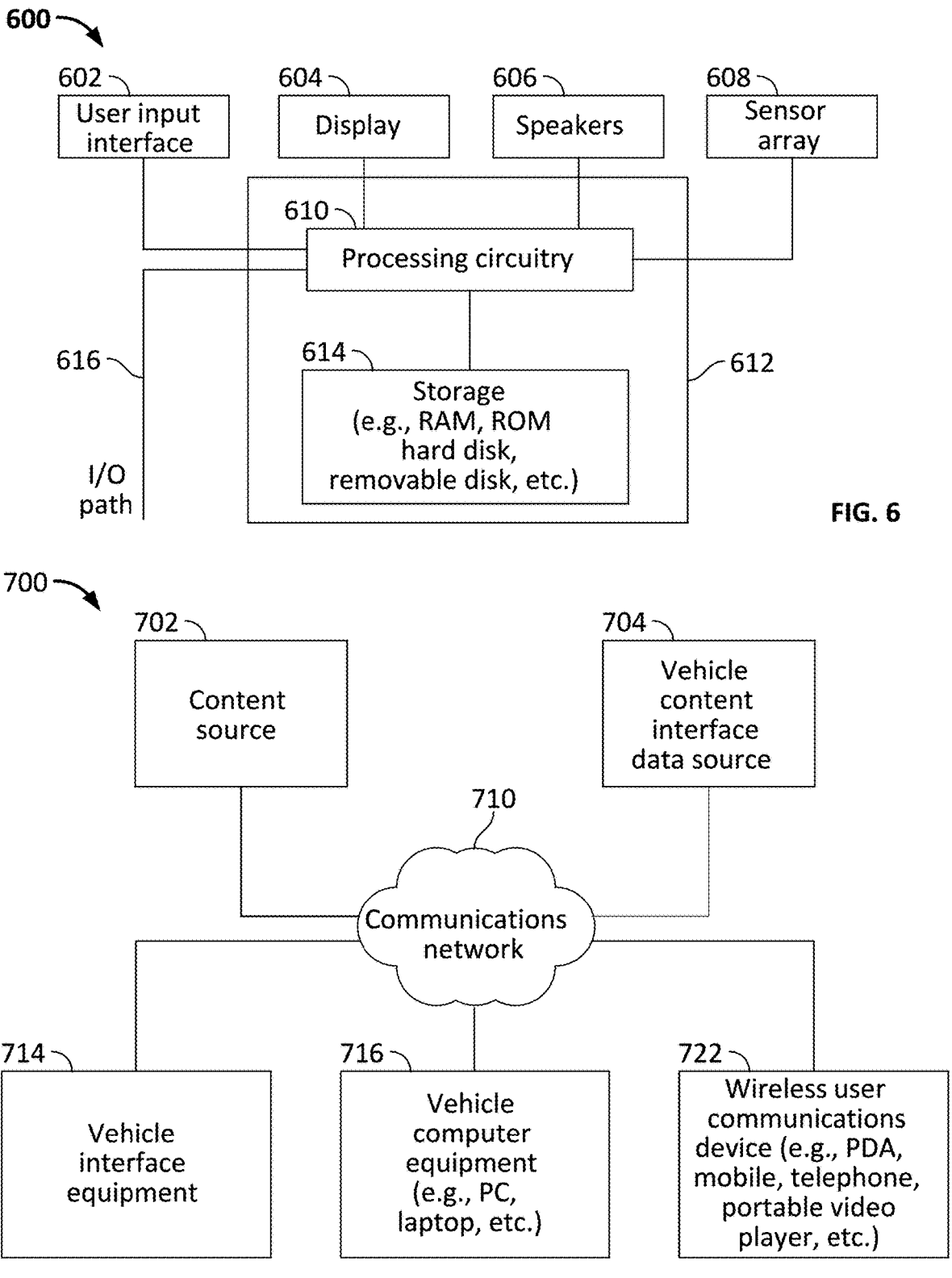
FIG. 6 illustrates a simplified block diagram of an example vehicle computing device, according to aspects of the present disclosure.
FIG. 7 depicts an illustrative system implementing the vehicle computing device of FIG. 6, according to aspects of the present disclosure.

FIG. 5 is a flowchart of an illustrative process for identifying the occupant of a vehicle interacting with a vehicle user interface, in accordance with some embodiments of the disclosure. As shown in FIG. 5, in accordance with some embodiments, a process 500 may be executed by processing circuitry 610 of a vehicle (FIG. 6). It should be noted that process 500 or any step thereof could be performed on, or provided by, the system of FIGS. 6 and 7 or any of the devices shown in FIGS. 1-4. In addition, one or more steps of process 500 may be incorporated into or combined with one or more other steps described herein. For example, process 500 may be executed by control circuitry 612 of FIG. 6 as instructed by an interface application implemented running on the vehicle computing device 600 in order to determine which occupant is making a control input to a user interface of the vehicle. Also, one or more steps of process 500 may be incorporated into or combined with one or more steps of any other process or embodiment.

At step 502, process 500 begins. At step 504, the interface application detects a control input. In some examples, the control input may be detected based on an interaction with the vehicle user interface, such as a tap, click, swipe, drag, button press, dial turn, or any other interaction with one or more elements of the vehicle user interface. In some examples, input/output circuitry of the vehicle UI may be configured to detect the control input.

Depending on whether a camera technique or an RF signal technique is used to determine the identity of the occupant making the control input, step 506 of the process 500 may include the interface application (and/or control circuitry) controlling a camera to capture image data near the vehicle UI. The image data may be captured during the time period the control input was made, as well as a time period before and/or after the control input was made. The captured image data may be analyzed to determine various information such as the pose and shape of a hand, arm, finger, or other element that contacted the vehicle UI, as well as the path taken by that element.

At step 508, the interface application (and/or input/output circuitry) may detect an RF signal present at a point of contact with the vehicle UI. As noted above, a different RF signal may be coupled to the steering wheel, seat, seatbelt, gearbox, windshield wiper control, light control, and/or another part of the vehicle for each of the driver's seat and passenger's seat. When a control input is detected, the interface application (and/or input/output circuitry) may be configured to detect the particular RF signal present at the point of contact with the vehicle UI.

At step 510, the interface application (and/or control circuitry) may identify the vehicle seat position from which the control input was made. As noted above, this may include the interface application analyzing the image data to determine which occupant made the control input. Additionally or alternatively, the interface application (and/or control circuitry) may detect the RF signal at the vehicle UI, and identify whether that RF signal corresponds to the driver seat or the passenger seat.

At step 512, the interface application (and/or control circuitry) may determine whether an action corresponding to the received control input is permitted or not. As noted above, some actions may be permitted while others may not, depending on the status of the vehicle (i.e., whether it is in park or not), as well as the identity of the person making the control input (i.e., the driver or passenger).

If the action is permitted, step 514 includes the interface application (and/or control circuitry) executing the action corresponding to the received control input. Alternatively, if the action is not permitted, step 516 includes the interface application (and/or control circuitry) ignoring the control input. Additionally, the interface application (and/or input/output circuitry) may provide an alert indicating that the action is not allowed at this time.

Process 500 may then proceed back to step 504 to detect a next control input, and repeat the process described above with respect to the next control input. Process 500 may end at step 518, under various circumstances such as when the vehicle is put into park (in which case all actions are available to both the driver and passenger), when the vehicle is turned off, or when a setting is selected to stop the interface application from being executed.

FIG. 6 depicts example devices and related hardware for enabling occupant-based control of various functions of a vehicle by determining which occupant of the vehicle is interacting with the vehicle UI, in accordance with some embodiments of the disclosure. FIG. 6 shows a generalized embodiment of illustrative vehicle computing device 600. Vehicle computing device 600 may receive data via input/output (I/O) path 616, and may process input data and output data using input/output circuitry (not shown). I/O path 616 may provide content (e.g., broadcast programming, on-demand programming, Internet content, content available over a local area network (LAN) or wide area network (WAN), and/or other content) and data to control circuitry 612, which includes processing circuitry 610 and storage 614. Control circuitry 612 may be used to send and receive commands, requests, and other suitable data using I/O path 616.

Control circuitry 612 may be based on any suitable processing circuitry such as processing circuitry 610. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units. In some embodiments, control circuitry 612 executes instructions for a vehicle interface application stored in non-volatile memory (i.e., storage 614). Specifically, control circuitry 612 may be instructed by the vehicle interface application to perform the functions discussed above and below. For example, the vehicle interface application may provide instructions to control circuitry 612 to identify control inputs to the vehicle user interface 602. In some implementations, any action performed by control circuitry 612 may be based on instructions received from the vehicle interface application.

In client/server-based embodiments, control circuitry 612 may include communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which are described in more detail in connection with FIG. 7). In some embodiments, a sensor array 608 is provided in the vehicle computing device 600. The sensor array 608 may be used for capturing image data, audio data, RF data, and/or any other data described herein, generating various data (including RF data), and making various determinations and identifications as discussed in this disclosure. The sensor array 608 may include various sensors, such as one or more cameras, microphones, ultrasonic sensors, RF sensors, and light sensors, for example. The sensor array 608 may also include sensor circuitry which enables the sensors to operate and receive and transmit data to and from the control circuitry 612 and various other components of the vehicle computing device 600. In addition, communications circuitry may include circuitry that enables peer-to-peer communication of user equipment devices, or communication of user equipment devices in locations remote from each other (described in more detail below).

Memory may be an electronic storage device provided as storage 614 that is part of control circuitry 612. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 614 may be used to store various types of content described herein as well as content data and application data that are described above. Nonvolatile memory may also be used (e.g., to launch a boot-up routine and other instructions). Cloud-based storage may be used to supplement storage 614 or instead of storage 614.

Control circuitry 612 may include video generating circuitry and tuning circuitry, such as one or more analog tuners, one or more decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 612 may also include scaler circuitry for upconverting and down-converting content into the preferred output format of the user equipment device 600. Sensor array 608 and/or control circuitry 612 may also include digital-to-analog converter circuitry and analog-to-digital converter circuitry for converting between digital and analog signals. The tuning and encoding circuitry may be used by the vehicle computing device to receive and to display, play, or record content. In some embodiments, the control circuitry may include an HD antenna. In some embodiments, sensor array 608 and/or control circuitry 612 may include a signal generator configured to generate RF signals and couple them to the steering wheel, seats, seatbelts, etc., as described above.

In one embodiment, speakers 606 may be provided as integrated with other elements of vehicle computing device 600 or may be stand-alone units. The audio and other content displayed on display 604 may be played through speakers 606. In some embodiments, the audio may be distributed to a receiver (not shown), which processes and outputs the audio via speakers 606.

In some embodiments, the sensor array 608 is provided in the vehicle computing device 600. The sensor array 608 may be used to monitor, identify, and/or determine the identity of the occupant(s) interacting with the vehicle user interface 602. For example, the vehicle interface application may receive image data from the sensor array (e.g., cameras) that are used to identify which occupant is making a control input to the vehicle user interface 602.

The vehicle interface application may be implemented using any suitable architecture. For example, it may be a stand-alone application wholly implemented on vehicle computing device 600. In such an approach, instructions of the interface application are stored locally (e.g., in storage 614), and data for use by the interface application is downloaded on a periodic basis (e.g., from an out-of-band feed, from an Internet resource, or using another suitable approach). Control circuitry 612 may retrieve instructions of the interface application from storage 614 and process the instructions to carry out any of the functions discussed herein. Based on the processed instructions, control circuitry 612 may determine what action to perform when input is received from input interface 602. For example, the movement of a cursor on an audio user interface element may be indicated by the processed instructions when input interface 602 indicates that a user interface 602 was selected. In some examples, a vehicle may include multiple electronic control units (ECUs) used in conjunction to achieve one or more functions. For example, the sensor array 608 may be fitted with its own processing circuitry (similar to processing circuitry 610) and storage (similar to storage 614) and may communicate via an input/output path (similar to I/O path 616) to another processing circuitry and/or storage. Similarly, display 604 and UI 602 may be connected to another processing circuitry and/or storage. This architecture enables various components to be separated, and may segregate functions to provide failure separation and redundancy.

In some embodiments, the vehicle interface application is a client/server-based application. Data for use by a thick or thin client implemented on vehicle computing device 600 is retrieved on-demand by issuing requests to a server remote to the vehicle computing device 600. In one example of a client/server-based application, control circuitry 612 runs a web browser that interprets web pages provided by a remote or edge server. For example, the remote server may store the instructions for the application in a storage device. The remote server may process the stored instructions using circuitry (e.g., control circuitry 612) and carry out one or more of the functions discussed herein. The client device may receive data from the remote server and may also carry out one or more of the functions discussed herein locally on vehicle computing device 600. This way, the processing of the instructions is performed at least partially remotely by the server while other functions are executed locally on vehicle computing device 600. Vehicle computing device 600 may receive inputs from the user or occupant of the vehicle via input interface 602 and transmit those inputs to the remote server for processing. For example, vehicle computing device 600 may transmit, via one or more antenna, communication to the remote server, indicating that a user interface element was selected via input interface 602. The remote server may process instructions in accordance with that input and generate a display of content identifiers associated with the selected user interface element. The generated display is then transmitted to vehicle computing device 600 for presentation to the user or occupant of the vehicle.

In some embodiments, the vehicle interface application is downloaded and interpreted or otherwise run by an interpreter or virtual machine (run by control circuitry 612). The vehicle interface application may operate in connection with or as a part of an electronic control unit (ECU) of a vehicle. The ECU may be one of many ECUs of the vehicle, wherein each ECU operates to control a particular set of functions of the vehicle, such as engine controls, power train controls, transmission controls, brake controls, etc. The vehicle interface application may operate in connection with one or more ECUs of the vehicle in order to carry out the functions described herein.

Vehicle computing device 600 of FIG. 6 can be implemented in system 700 of FIG. 7 as vehicle interface equipment 714, vehicle computer equipment 716, wireless user communications device 722 or any other type of user equipment. For simplicity, these devices may be referred to herein collectively as interface equipment or interface equipment devices and may be substantially similar to the vehicle computing device described above. Interface equipment devices, on which one or more functions of the interface application described herein may be implemented, may function as stand-alone devices or may be part of a network of devices. Various network configurations of devices may be implemented and are discussed in more detail below.

FIG. 7 depicts example systems, servers, and related hardware for enabling occupant-based control of various functions of a vehicle, by determining which occupant of the vehicle is interacting with the vehicle UI, in accordance with some embodiments of the disclosure. An interface equipment device utilizing at least some of the system features described above in connection with FIG. 7 may not be classified solely as vehicle interface equipment 714, vehicle computer equipment 716, or a wireless user communications device 722. For example, vehicle interface equipment 714 may, like some vehicle computer equipment 716, be Internet-enabled, allowing for access to Internet content, while wireless user computer equipment 722 may, like some vehicle interface equipment 714, include a tuner allowing for access to media programming. The vehicle interface application may have the same layout on various types of user equipment or may be tailored to the display capabilities of the interface equipment. For example, on wireless user computer equipment 716, the vehicle interface application may be provided as a website accessed by a web browser. In another example, the vehicle interface application may be scaled down for wireless user communications devices 722.

The interface equipment devices may be coupled to communications network 710. Communications network 710 may be one or more networks including the Internet, a mobile phone network, mobile voice or data network (e.g., a 4G, 5G or LTE network), cable network, public switched telephone network, or other types of communications network or combinations of communications networks.

System 700 includes content source 702 and vehicle interface data source 704 coupled to communications network 710. Communications with the content source 702 and the data source 704 may be exchanged over one or more communications paths but are shown as a single path in FIG. 7 to avoid overcomplicating the drawing. Although communications between sources 702 and 704 with interface equipment devices 714, 716, and 722 are shown through communications network 710, in some embodiments, sources 702 and 704 may communicate directly with user equipment devices 714, 716, and 722.

Content source 702 may include one or more types of content distribution equipment including a media distribution facility, satellite distribution facility, programming sources, intermediate distribution facilities and/or servers, Internet providers, on-demand media servers, and other content providers. Vehicle interface data source 704 may provide content data. Vehicle interface application data may be provided to the interface equipment devices using any suitable approach. In some embodiments, vehicle interface data from vehicle interface data source 704 may be provided to the interface equipment using a client/server approach. For example, an interface equipment device may pull content data from a server, or a server may present the content data to an interface equipment device. Data source 704 may provide interface equipment devices 714, 716 and 722 the vehicle interface application itself or software updates for the vehicle interface application.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent, or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers, or steps. Throughout the description and claims of this specification, the singular encompasses the plural unless the context otherwise requires. In particular, where the indefinite article is used, the specification is to be understood as contemplating plurality as well as singularity, unless the context requires otherwise.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method for executing an action in a vehicle comprising a first seat position and a second seat position, the method comprising:

emitting a first radio frequency (RF) signal from a first vehicle seat position via at least one of a steering wheel, a first seat belt, a first armrest, a first gear shift, or a first seat;

emitting a second RF signal from a second vehicle seat position via at least one of a second seat belt, a second armrest, or a second seat;

detecting, based on an interaction with a user display, a control input;

determining that the interaction with the user display corresponds to the second seat position based on detecting the second RF signal at a point of contact between the control input and the user display, wherein the second RF signal passes from an occupant in the second seat position to the point of contact;

determining that execution of the action corresponding to the control input is permitted when selected by the occupant positioned in the second vehicle seat position; and executing the action corresponding to the control input.

2. The method of claim 1, wherein determining that the interaction with the user display corresponds to the second seat position further comprises:

capturing, using a camera, image data of an area proximate the user display during the interaction with the user display;

determining, based on the image data, that the interaction with the user display was made by the occupant positioned in the second seat; and identifying the second seat as the second vehicle seat position.

3. The method of claim 2, further comprising:

capturing, using the camera, the image data of the area proximate the user display during a time period prior to the interaction with the user display;

identifying a path of a hand of the occupant based on the image data captured during the time period prior to the interaction with the user display; and determining the second vehicle seat position based on the path of the hand of the occupant.

4. The method of claim 1, wherein the control input comprises a first control input of a first set of control inputs corresponding to a first set of actions which are permitted when selected by the occupant positioned in the second vehicle seat position, the method further comprising:

detecting, based on an interaction with the user display by an occupant positioned in the first vehicle seat position, a second control input, wherein the second control input is one of a second set of control inputs corresponding to a second set of actions which are not permitted when selected by the occupant positioned in the first vehicle seat position; and presenting an alert to the occupant positioned in the first vehicle seat position that the action corresponding to the second control input is not allowed.

5. The method of claim 1, wherein the action corresponding to the control input is a first action when the control input is selected by a first occupant in the second vehicle seat position, and a second action when the control input is selected by a second occupant in the first vehicle seat position, the method further comprising:

determining whether the first occupant or the second occupant selected the control input; and executing either the first action or the second action based on whether the first occupant or the second occupant selected the control input.

6. The method of claim 1, wherein the user display comprises a mobile device.

7. The method of claim 1, wherein the first RF signal and the second RF signal differ based at least on:

having different frequencies or having different data sequencies encoded onto a common carrier frequency.

8. The method of claim 7, wherein detecting the second RF signal at the point of contact between the control input and the user display comprises:

identifying at least one of a frequency or data sequence associated with the second RF signal.

9. The method of claim 8, wherein the at least one of the frequency or the data sequence of each RF signal changes over time.

10. The method of claim 1, wherein the user display is a capacitive touch screen configured to detect RF signals via control inputs, and wherein the user display is equipped with a notch filter configured to filter out RF noise.

11. A system for executing an action in a vehicle comprising a first seat position and a second seat position, the method comprising:

input/output circuitry configured to:

emit a first radio frequency (RF) signal from a first vehicle seat position via at least one of a steering wheel, a first seat belt, a first armrest, a first gear shift, or a first seat;

emit a second RF signal from a second vehicle seat position via at least one of a second seat belt, a second armrest, or a second seat;

detect, based on an interaction with a user display, a control input; and control circuitry configured to:

determine that the interaction with the user display corresponds to the second seat position based on detecting the second RF signal at a point of contact between the control input and the user display, wherein the second RF signal passes from an occupant in the second seat position to the point of contact;

determine that execution of the action corresponding to the control input is permitted when selected by the occupant positioned in the second vehicle seat position; and execute the action corresponding to the control input.

12. The system of claim 11, wherein the control circuitry is further configured to determine that the interaction with the user display corresponds to the second seat position by:

capturing, using a camera, image data of an area proximate the user display during the interaction with the user display;

determining, based on the image data, that the interaction with the user display was made by the occupant positioned in the second seat; and identifying the second seat as the second vehicle seat position.

13. The system of claim 12, wherein the control circuitry is further configured to:

capture, using the camera, the image data of the area proximate the user display during a time period prior to the interaction with the user display;

identify a path of a hand of the occupant based on the image data captured during the time period prior to the interaction with the user display; and determine the second vehicle seat position based on the path of the hand of the occupant.

14. The system of claim 11, wherein the control input comprises a first control input of a first set of control inputs corresponding to a first set of actions which are permitted when selected by the occupant positioned in the second vehicle seat position, wherein the input/output circuitry is further configured to:

detect, based on an interaction with the Uluser display by the occupant positioned in the first vehicle seat position, a second control input, wherein the second control input is one of a second set of control inputs corresponding to a second set of actions which are not permitted when selected by the occupant positioned in the first vehicle seat position; and present an alert to the occupant positioned in the first vehicle seat position that the action corresponding to the second control input is not allowed.

15. The system of claim 11, wherein the action corresponding to the control input is a first action when the control input is selected by a first occupant in the second vehicle seat position, and a second action when the control input is selected by a second occupant in the first vehicle seat position, wherein the control circuitry is further configured to:

determine whether the first occupant or the second occupant selected the control input; and execute either the first action or the second action based on whether the first occupant or the second occupant selected the control input.

16. The system of claim 11, wherein the user display comprises a mobile device.

17. The system of claim 11, wherein the first RF signal and the second RF signal differ based at least on:

having different frequencies or having different data sequences encoded onto a common carrier frequency.

18. The system of claim 17, wherein the input/output circuitry is configured to detect the second RF signal at the point of contact between the control input and the user display by:

identifying at least one of a frequency or data sequence associated with the second RF signal.

19. The system of claim 18, wherein the at least one of the frequency or the data sequence of each RF signal changes over time.

20. The system of claim 11, wherein the user display is a capacitive touch screen configured to detect RF signals via control inputs, and wherein the user display is equipped with a notch filter configured to filter out RF noise.

* * * * *